United States Patent
Chandy et al.

[11] Patent Number: 5,704,446
[45] Date of Patent: Jan. 6, 1998

[54] ELECTRIC POWER STEERING CONTROL

[75] Inventors: Ashok Chandy, Fenton; Farhad Bolourchi; Christophe Etienne, both of Saginaw, all of Mich.

[73] Assignee: General Motors Corporation, Detroit, Mich.

[21] Appl. No.: 538,155

[22] Filed: Oct. 2, 1995

[51] Int. Cl.⁶ .................................................. B62D 5/04
[52] U.S. Cl. ........................... 180/446; 364/424.05
[58] Field of Search ............................. 180/443, 446; 364/424.01, 424.05

[56] References Cited

U.S. PATENT DOCUMENTS

| | | | |
|---|---|---|---|
| 4,457,132 | 7/1984 | Roberts | 60/384 |
| 4,530,413 | 7/1985 | Buike et al. | 180/79.1 |
| 4,629,024 | 12/1986 | Buike et al. | 180/79.1 |
| 4,688,655 | 8/1987 | Shimizu | 180/79.1 |
| 4,825,972 | 5/1989 | Shimizu | 180/79.1 |
| 4,837,692 | 6/1989 | Shimizu | 364/424.05 |
| 4,869,335 | 9/1989 | Takashashi | 180/140 |
| 4,979,114 | 12/1990 | Oshita et al. | 364/424.05 |
| 4,984,646 | 1/1991 | Sano et al. | 180/79.1 |
| 5,103,926 | 4/1992 | Ohno et al. | 180/142 |
| 5,198,981 | 3/1993 | Collier-Hallman et al. | 364/424.05 |
| 5,216,345 | 6/1993 | Eyerly | 318/685 |
| 5,219,035 | 6/1993 | Tsurumiya et al. | 180/79.1 |
| 5,239,490 | 8/1993 | Masaki et al. | 364/565 |
| 5,369,349 | 11/1994 | Tsuchiya et al. | 318/811 |
| 5,398,953 | 3/1995 | Shimizu | 180/79.1 |
| 5,473,539 | 12/1995 | Shimizu et al. | 180/466 X |

FOREIGN PATENT DOCUMENTS

0 683 086 A1  11/1995  European Pat. Off. .

*Primary Examiner*—Kevin Hurley
*Attorney, Agent, or Firm*—Anthony Luke Simon

[57] ABSTRACT

An electric power steering control apparatus comprising a vehicle steering wheel, a torque sensor for sensing torque in the vehicle steering column, a motor for providing motive force power assist to the steering system, a controller receiving the torque sensor signal and providing a motor control command to the motor responsive thereto, wherein the motor provides the motive force power assist responsive to the motor control command, and a high pass/low pass filter in the controller, wherein the high pass/low pass filter isolates low frequency components of the sensed vehicle steering system torque representing operator input torque and wherein the controller, responsive to the low frequency components determines a first, driver responsive, component of the motor control command, wherein the high pass/low pass filter isolates high frequency components of the sensed vehicle steering system torque and wherein the controller, responsive to the high frequency components, determines a second component of the motor control command.

8 Claims, 10 Drawing Sheets

HERTZ

ELECTRIC POWER STEERING CONTROL

This invention relates to an electric power steering control method and apparatus.

BACKGROUND OF THE INVENTION

In a known manner, typical vehicle steering systems are constructed so that when a driver does not apply steering torque to the steering wheel, and the vehicle is moving, the vehicle steering tends to return to the center, or straight line of travel, position. This return-to-center function is in response to road forces acting on the turned front tires of the moving vehicle that tend to force the turned tires to the neutral (center) position. However, excess friction in the steering system can interfere with the return-to-center function of the steering. One known method to prevent this is to reduce the overall steering ratio of the steering system. This has the effect of increasing steering sensitivity, which is not always desirable.

In electric power steering systems, a known technique for preventing steering system friction from interfering with the return-to-center function is to generate a command, in relation to vehicle speed, that commands the electric power steering actuator to provide a return-to-center position force. The force commanded to the actuator overcomes the steering friction and allows the return-to-center function.

In a known manner, electric power steering motors are controlled, in some systems, in a current mode and, in other systems, in a voltage mode. Current mode control provides certain advantages because the inherent control damping and speed dependability of voltage mode control are eliminated. However, the elimination of the control damping that is present in the voltage mode can prevent the system from obtaining stable closed-loop poles.

SUMMARY OF THE PRESENT INVENTION

The electric power steering control according to the present invention is characterized by the features specified in claim 1.

Advantageously, the present invention provides an electric power steering control that utilizes steering position to command return-to-center steering.

Advantageously, the present invention provides an electric power steering control that effectively amplifies the return-to-center road forces on the turned tires of the vehicle to overcome steering friction and to return the steering to the neutral position when the vehicle operator does not apply a turning torque to the steering wheel.

Advantageously, the present invention provides an electric power steering control that allows an electric power steering system to have any desirable overall steering ratio. Thus, this invention allows the selection of a steering ratio for a vehicle without regard to steering system friction.

Advantageously, this invention provides an electric power steering control that has a stable response to steering wheel inputs.

Advantageously this invention provides an electric power steering control with a compensating filter that modifies the sensed steering wheel torque input signal to provide an overall stable system with desired operating characteristics.

Advantageously, this invention provides an electric power steering control that uses a high pass/low pass filter to improve system steering feel.

Advantageously, this invention provides an electric power steering control that uses a high pass/low pass filter to separate steering wheel torque into high frequency and low frequency components. Advantageously, this invention realizes that the operator input to the measured steering wheel torque is in the low frequency component and determines an assist torque command responsive to the low frequency component. Advantageously, this invention utilizes the high frequency component of the measured steering wheel torque to provide closed loop gain of the steering system, thus maintaining a smooth steering feel even when operator input torque is low or zero. Advantageously, by using the high frequency component of the measured steering wheel torque to provide closed loop gain for the steering system, this invention prevents the steering system from reverting to open loop operation during low or zero operator torque inputs. Advantageously, by maintaining a closed loop gain for the steering system during low and zero operator torque inputs, this invention improves driver isolation from road and internal system inputs such as road bumps, motor torque irregularities, etc., Advantageously, this invention reduces the effect of power steering motor and actuator inertia on steering feel.

Advantageously, a preferred electric power steering control of this invention is accomplished according to the steps of: measuring steering wheel torque; measuring steering wheel angle; measuring vehicle speed; responsive to the measured steering wheel torque and vehicle speed, determining a power assist command; responsive to the measured steering wheel angle and vehicle speed, determining a return-to-center command; subtracting the return-to-center command from the power assist command to obtain a motor command; and commanding a power assist motor responsive to the motor command.

Advantageously, an example preferred electric power steering control according to this invention accomplishes the step of determining the return-to-center command according to the sub-steps of determining a parking return-to-center command responsive to the measured steering wheel angle and a first predetermined function, determining a highway return-to-center command responsive to the measured steering wheel angle and a second predetermined function, and blending the parking and highway return-to-center commands responsive to vehicle speed.

Advantageously, a preferred electric power steering control apparatus according to this invention comprises: a torque sensor coupled to a vehicle steering system for measuring steering wheel torque provided by a vehicle operator, a steering angle sensor coupled to the steering system for measuring steering wheel angle, a controller, responsive to the measured steering wheel torque and a vehicle speed, providing a sum return-to-center command, and a motor responsive to the sum return-to-center command, wherein the controller determines a low speed return-to-center command responsive to the measured steering wheel torque and a first predetermined function, determines a high speed return-to-center command responsive to the measured steering wheel torque and a second predetermined function and blends the low and high speed return-to-center commands to obtain the sum return-to-center command.

Advantageously, an example electric power steering control according to this invention comprises: a torque sensor outputting a torque signal indicative of operator torque on a vehicle steering wheel; a controller, receiving the torque signal and, responsive thereto, providing a motor current command; an electric motor providing power assist to the electric power steering control system responsive to the motor current command; and a compensating filter, within the controller, receiving the torque signal and providing a transfer function operation thereon, wherein the transfer function shapes a root locus of the control system so that the closed loop poles lie in a well damped region. In a preferred example of this invention the compensation filter provides a damping ratio between the steering wheel and the motor in a range greater than 0.2.

Advantageously, another example electric power control according to this invention comprises a vehicle steering wheel, a torque sensor for sensing torque in the vehicle steering system, a motor for providing motive power assist to the steering system, a controller receiving the torque sensor signal and providing a motor control command responsive thereto to the motor, wherein the motor provides the motive power assist responsive to the motor control command, and a high pass/low pass filter in the controller, wherein the high pass/low pass filter isolates low frequency components of the sensed vehicle steering system torque primarily representing operator input torque, wherein the controller, responsive to the low frequency components, determines a first, driver-responsive, component of the motor control command, wherein the high pass/low pass filter isolates high frequency components of the sensed vehicle steering system torque and wherein the controller, responsive to the high frequency components, determines a second component of the motor control command that maintains closed loop control over an entire range of driver inputs.

BRIEF DESCRIPTION OF THE DRAWINGS

The present invention will now be described, by way of example, with reference to the accompanying drawings, in which.

DETAILED DESCRIPTION OF THE INVENTION

Figure 1:
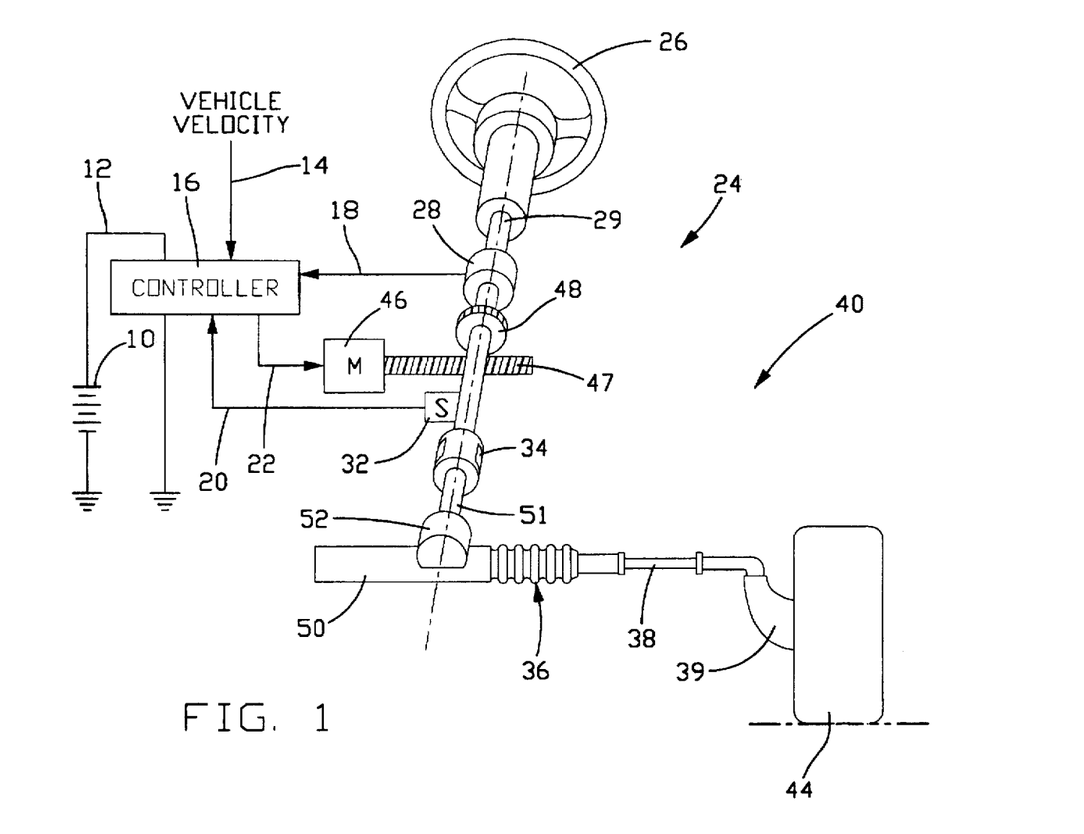
FIG. 1 is a schematic diagram showing an electric power steering control system according to this invention.

Referring to FIG. 1, reference numeral 40 generally designates a motor vehicle power steering system suitable for implementation of this invention. The steering mechanism 36 is a rack-and-pinion type system and includes a toothed rack (not shown) within housing 50 and a pinion gear (also not shown) located under gear housing 52. As the steering wheel 26 is turned, the steering shaft 29 turns and the lower steering shaft 51, connected to the upper steering shaft 29 through universal joint 34, turns the pinion gear. Rotation of the pinion gear moves the rack which moves tie rods 38 (only one shown) in turn moving the steering knuckles 39 (only one shown), which turn wheels 44 (only one shown).

Electric power steering assist is provided through the unit generally designated by reference numeral 24 and includes the controller 16 and the electric motor 46. The controller 16 is powered by the vehicle power supply 10 through line 12. The controller 16 receives a signal representative of the vehicle velocity on line 14. Steering pinion gear angle is measured through position sensor 32, which may be an optical encoding type sensor, variable resistance type sensor, or any other suitable type of position sensor, and fed to the controller 16 through line 20.

As the steering wheel 26 is turned, torque sensor 28 senses the torque applied to the steering wheel 26 by the vehicle operator. The torque sensor 28 may include a torsion bar (not shown) and a variable resistive-type sensor (also not shown) which outputs a variable resistance signal to controller 16 through line 18 in relation to the amount of twist on the torsion bar. Although this is the preferable torque sensor, any other suitable torque sensing device used with known signal processing techniques will suffice.

In response to the inputs on lines 14, 18 and 20, the controller sends a current command to the electric motor 46, which supplies torque assist to the steering system through worm 47 and worm gear 48, providing torque assist to the vehicle steering.

Figure 2:
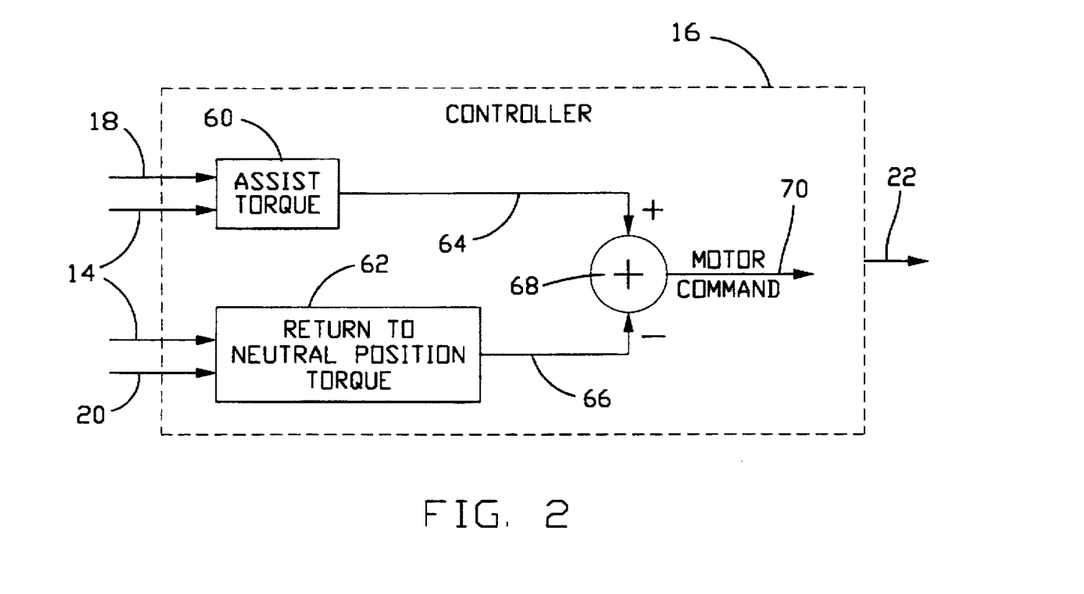
FIG. 2 is a schematic illustrating electric power steering control according to this invention.

Referring to FIG. 2, the control of the controller 16 generally implements two main functions according to this invention. Block 60 determines the desired assist torque current command representing the amount of motor current to be commanded responsive to the inputs of steering wheel torque on line 18 and vehicle velocity on line 14. Block 60 outputs the desired assist torque current command on line 64.

Block 62 determines the amount of return-to-center torque current, representing the amount of motor current to be commanded to achieve the desired return-to-center function. Block 62 outputs the desired return-to-center current command on line 66. Lines 64 and 66 are fed to summation block 68, where the magnitude of the return-to-center current command is subtracted from the assist torque current command to determine the sum current command on line 70. The sum current command on line 70 is then processed in a known manner to provide the motor current command on line 22.

Figure 3:
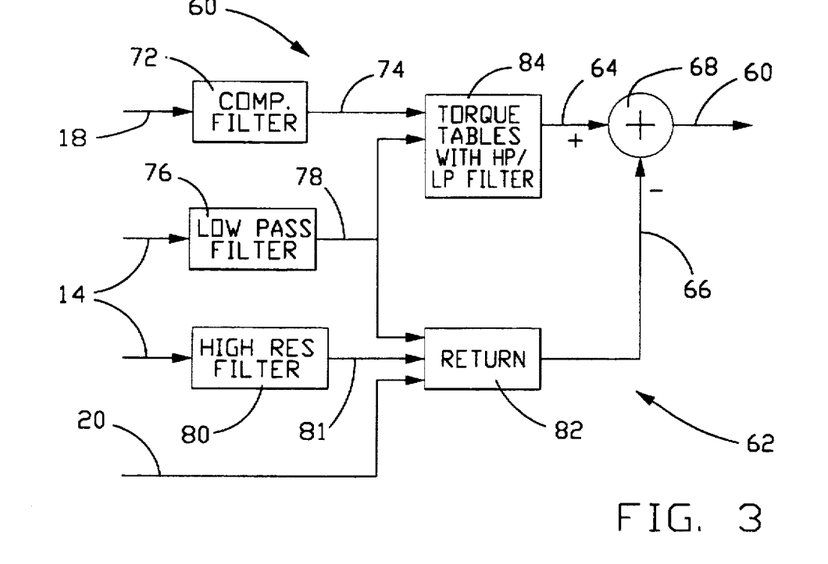
FIG. 3 is a control schematic of electric power steering control according to this invention.

Blocks 60 and 62 can be better understood with reference to FIG. 3. Referring now to FIG. 3, blocks 72, 76 and 84 determine the assist torque current command on line 64 and blocks 76, 80 and 82 determine the return-to-center current command on line 66. Block 72 is a compensation filter that receives the sensed steering wheel torque on line 18, employs a compensation filter function to the sensed steering wheel torque and provides a filtered steering wheel torque signal on line 74. The purpose of the compensation filter is to add desired stability and "feel" to the system. This is achieved through a compensation filter transfer function that cancels out, or compensates for, steering system response to the torque input signal over a range of frequencies.

Figure 4A:
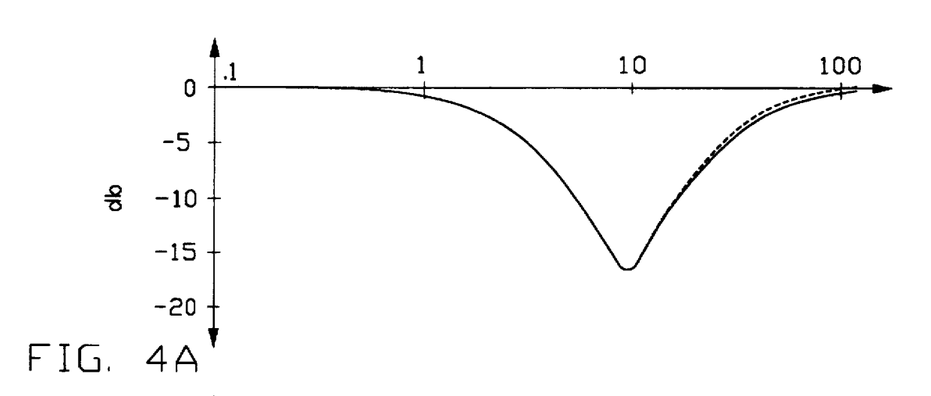
FIGS. 4A, 4B and 5 illustrate the operation of a compensator filter for use in the control of FIG. 3.
Figure 4B:
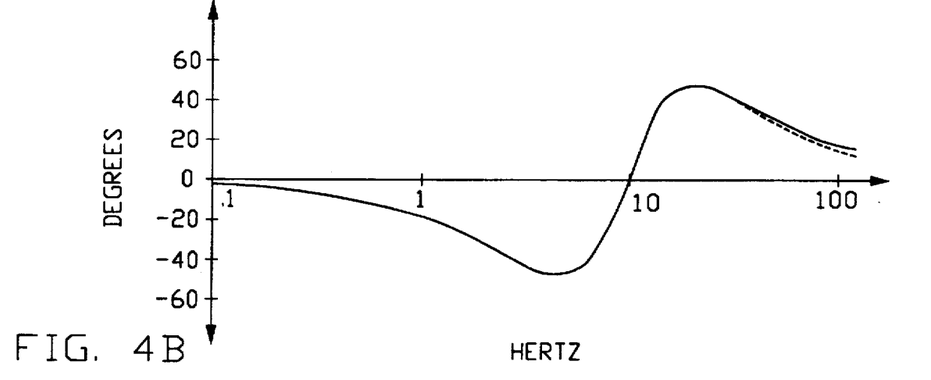
Figure 5:
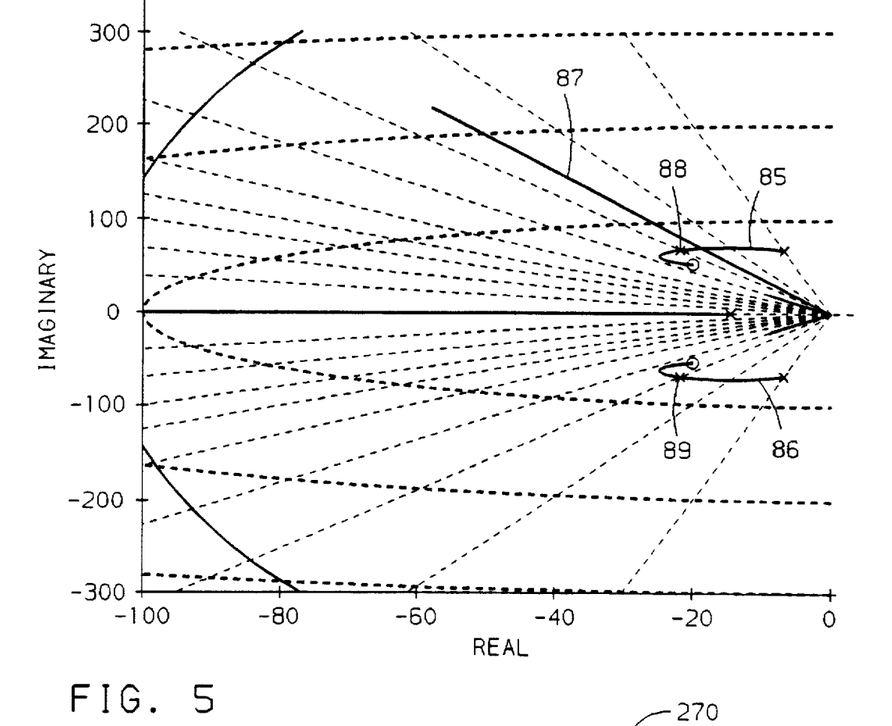

More particularly, block 72 consists of a compensation. Referring to FIGS. 4A and 4B, the magnitude and phase response of the compensation filter is shown. In one example, the compensation filter has real poles at 2.64 and 36.8 Hz and a pair of complex zeroes at 9.86 Hz with a damping ratio of 0.32. In general, the damping ratio is preferably greater than 0.2. The root-locus of the compensated system is shown in FIG. 5. The un-damped poles are moved away from the imaginary axis, providing increased damping and improved stability margins. As a result of this reshaping of the root locus the compensated system can tolerate assist levels ten times that of an uncompensated system before instability occurs. The compensator filter according to FIGS. 4A, 4B and 5 has the transfer function of:

$$\frac{s^2 + 2\zeta\omega_n s + \omega_n^2}{(s+p_1)*(s+p_2)} * \frac{p_1*p_2}{\omega_n^2}$$

where $\zeta=0.32$, $\omega_n=9.86*2\pi$, $p_1=36.8*2\pi$ and $p_2=2.64*2\pi$. The portion of the transfer function $(p_1* p_2/\omega_n^2)$ guarantees that when s is zero, the transfer function equals one. One skilled in the art can easily implement the above transfer function in the form of a digital, analog or hybrid (combined digital and analog) filter in controller 16.

While the above example is the preferred current mode control compensation filter design, one skilled in the art can obtain a current mode control compensation filter design for any electric power steering system according to this invention. More particularly, for a given electric power steering system in which a current mode control is desired, a compensation filter can be obtained according to this invention by modeling a voltage control mode of the invention. Then using the voltage control model, a root-locus plot of the control system is determined. This step can be aided through use of commercially available software, such as MATRIX X™, by ISI Corporation. The desirability of looking at the voltage control model is that voltage control motor operation has inherent damping that enhances stability of the closed loop control system. The damping factor is the most difficult part to obtain for the compensation filter in the current control system.

Next, the current control model is created without the compensation filter and, using the same technique as with the voltage control system, a root locus plot is obtained. To design the compensation filter, the root locus plot of the current control system is graphically modified to place the closed loop poles in positions where damping similar to that of the voltage control system is obtained. From the graphically altered root locus plot, the new current control mode transfer function can be determined, and thus the compensation filter function can be determined in a manner known to those skilled in the art. The process of determining the transfer function can be simplified using a commercially available compensator design aid software.

Referring again to FIG. 5, the application of the above method is illustrated with reference to the voltage mode damping line 87. Voltage mode damping line 87 is the line that indicates the level of damping in the voltage mode root locus plot at a controller gain of 1. To operate the system in the current mode and maintain damping at or better than that obtained in the voltage mode operation at the same gain, the closed loop poles 88 and 89 must be kept within the damping level defined by damping line 87—that is pole 88 must be kept below and to the left of line 87 and pole 89 must be kept above and to the left of a line that is the mirror image (symmetric about the horizontal axis) of line 87.

Figure 6:
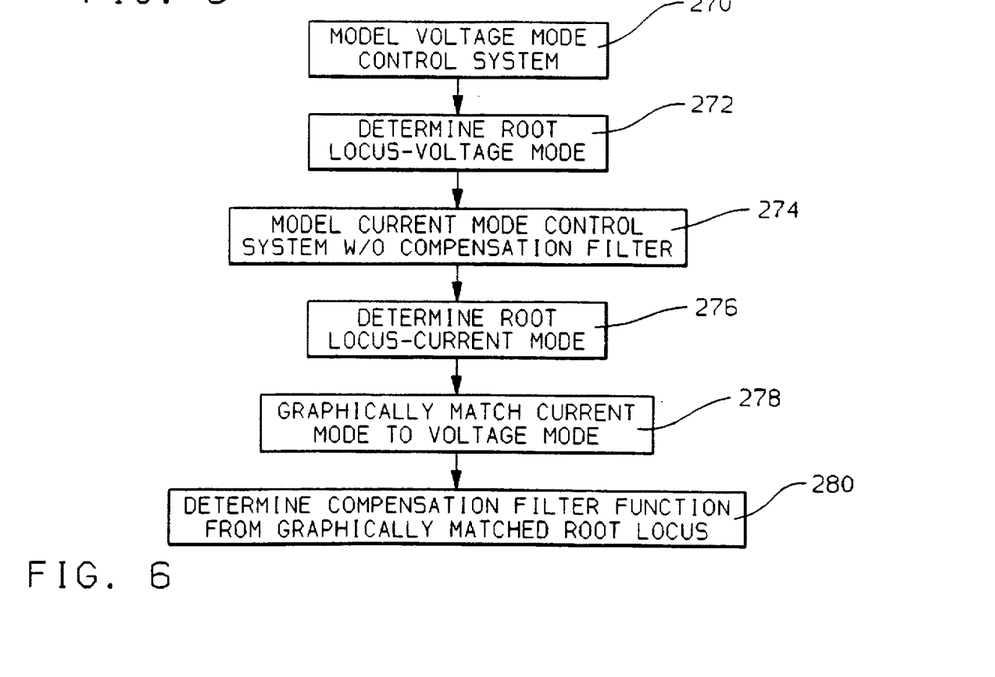
FIG. 6 illustrates a method of compensation filter design according to this invention.

The above described method is illustrated by blocks 270–280 of FIG. 6.

Using the above described method according to this invention, a compensating filter for current mode control can be designed for any electric power steering system.

While the above described compensator improves current control stability over a large operating range during low gain operation, the poles may revert to poorly damped open-loop positions, which is undesirable.

Figure 7:
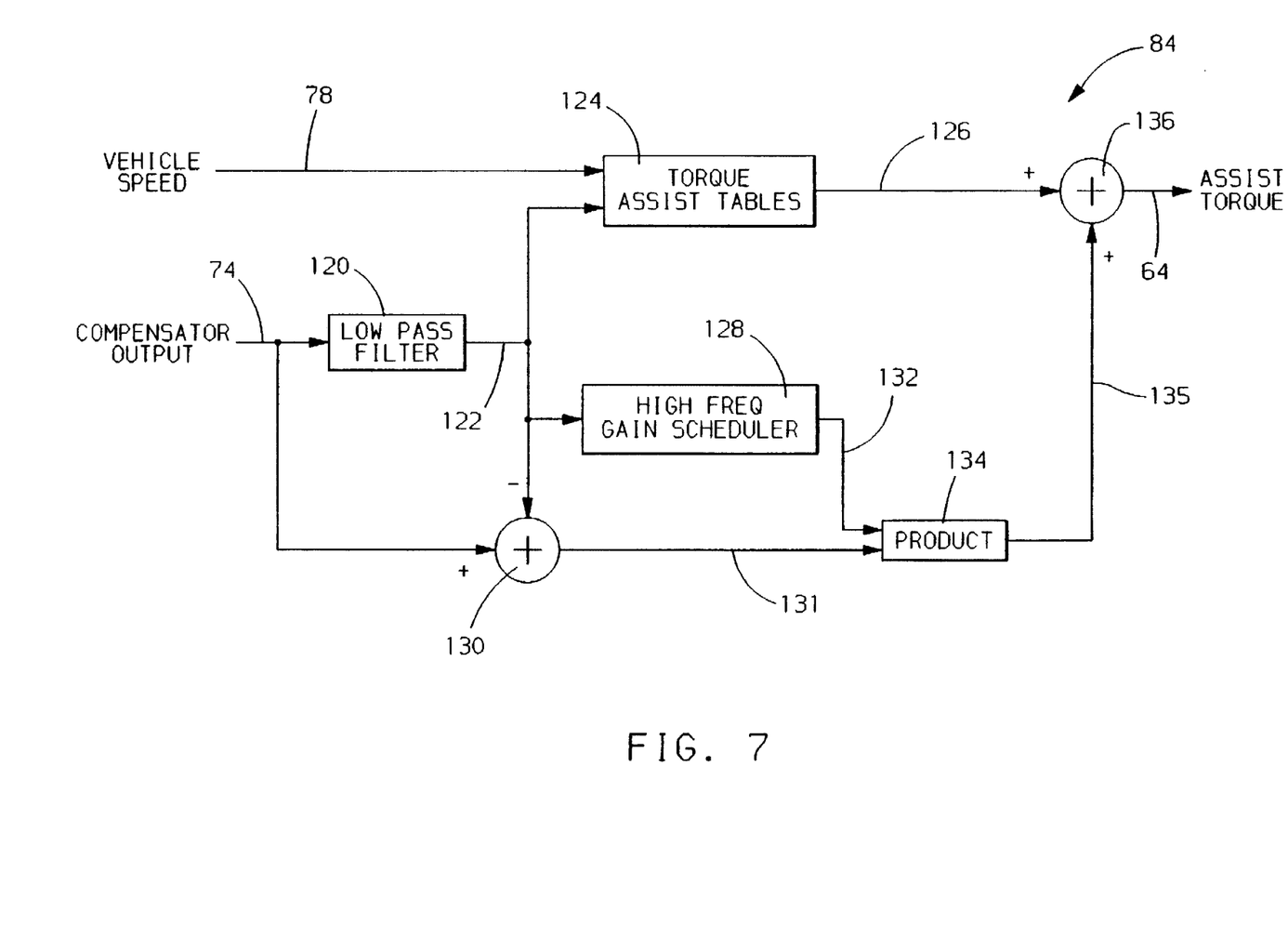
FIG. 7 illustrates an example combination high pass/low pass filter and torque assist look-up table for use in the control of FIG. 3.

To improve the low gain operation, a high pass/low pass filter is implemented in combination with the torque table operation of block 84 (FIG. 3). Referring to FIG. 7, the structure of block 84 is shown receiving the compensator output on line 74 and the vehicle speed signal on line 78.

The compensator output, provided on line 74, is coupled to the low pass filter 120 (e.g., 20 Hz) and to summation block 130. The low pass filter 120 provides a filtered low frequency component signal on line 122 that is provided to the look-up table 124, gain scheduler 128 and summation block 130. Summation block 130 subtracts the signal on line 122 from the signal on line 74 to obtain the filtered high frequency component signal on line 131.

Figure 8:
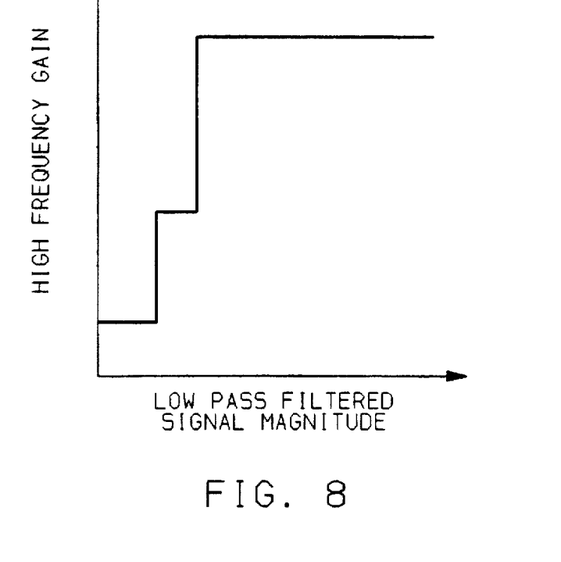
FIG. 8 illustrates an example transfer function of block 128 of FIG. 7.

Block 128 schedules, based on the low frequency signal on line 122, a gain for the high frequency component signal on line 131. FIG. 8 illustrates the function of block 128, which is designed so that the gain for the high frequency component signal mirrors the effective gain of the low frequency component signal and table 124, plus a predetermined offset. In other words, the high frequency gain of the high/pass low pass filter is preferably always slightly higher, but not too distant from, the low frequency gain operation of table 124. (In some operating conditions, depending upon the compensation filter design, the gain of the high pass filter may be allowed to be less than that of the low pass filter.) At block 134, the high frequency signal on line 131 is multiplied by the scheduled gain provided on line 132. The resultant signal is the high frequency responsive portion of the assist command and is provided on line 135.

Block 124 implements a torque-assist look-up table function responsive to hand wheel torque and vehicle speed. In the present invention, the tables at block 124 are responsive to the filtered vehicle speed signal on line 78 and the low frequency compensator signal on line 122. Thus, look-up table 124 is responsive to filtered vehicle speed and the compensated and filtered steering wheel torque.

Figure 9:
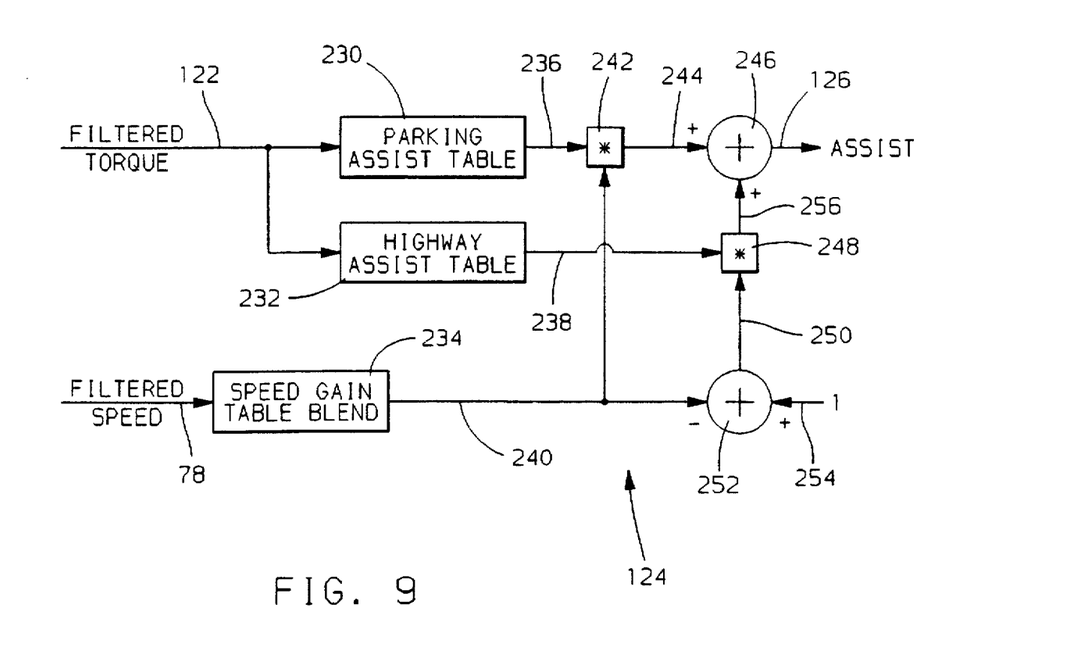
FIG. 9 illustrates the structure of block 124 of FIG. 7.

A detailed structure of look-up table block 124 is shown in FIG. 9. Referring to FIG. 9, the assist torque block 124 includes parking assist table 230, highway assist table 232 and blend ratio table 234. The low frequency component signal on line 122 is input to the parking and highway assist tables 230 and 232. The parking assist table 230 provides a driver responsive assist torque command indicating desired assist torque assuming that the vehicle is driven at speeds below 15 or 20 kph. The highway assist table 232 provides a driver responsive assist torque command indicating desired assist torque assuming that the vehicle is driven at highway speeds. The table functions can be implemented as the system designer desires. In one example, the highway assist table provides a higher assist rate than the parking assist table. The outputs of the tables 230 and 232 are provided on lines 236 and 238.

The filtered speed signal on line 78 is obtained by low pass filtering the vehicle speed signal on line 14 through a 2 or 3 Hz low pass filter 76 (FIG. 3). The filtered speed signal on line 78 is provided to the blend table 234 that outputs a value between zero and 1 responsive to the signal on line 78. The blend signal on line 240 is 1 for low vehicle speeds and reduces to zero for highway and higher vehicle speeds.

The blend signal on line 240 is provided to block 242 where it is multiplied by the driver responsive parking assist command on line 236, to provide the first fractional driver responsive assist command component on line 244. Block 252 indicates that the blend signal on line 240 is subtracted from 1 and the difference is provided on line 250. The signal on line 250 is provided to block 248 where it is multiplied by the driver responsive highway assist command on line 238 to provide the second fractional driver responsive assist command component on line 256.

Block 246 sums the first and second fractional driver responsive assist command components on lines 244 and 256 to provide the driver responsive assist command component on line 126.

Referring again to FIG. 7, at block 136, the driver-responsive assist command component on line 126 is summed with the high frequency responsive assist command component on line 135. The result of the summation block 136 is the assist torque current command on line 154.

The combination high pass/low pass filter and torque table implementation of FIG. 7 maintains high closed-loop gains at high steering wheel input frequencies and low steering wheel input torques. By maintaining high closed-loop gains, the control system can reject motor torque irregularities and unwanted road vibrations. Further, the use of the gain scheduler 128 ensures that the difference between the high and low frequency gains of the high pass/low pass filter is never too great. Using this strategy, this invention eliminates "free control" problems that may exist the effective frequency gain on line 132 is much greater than the effective gain of look-up table 124.

Figure 10:
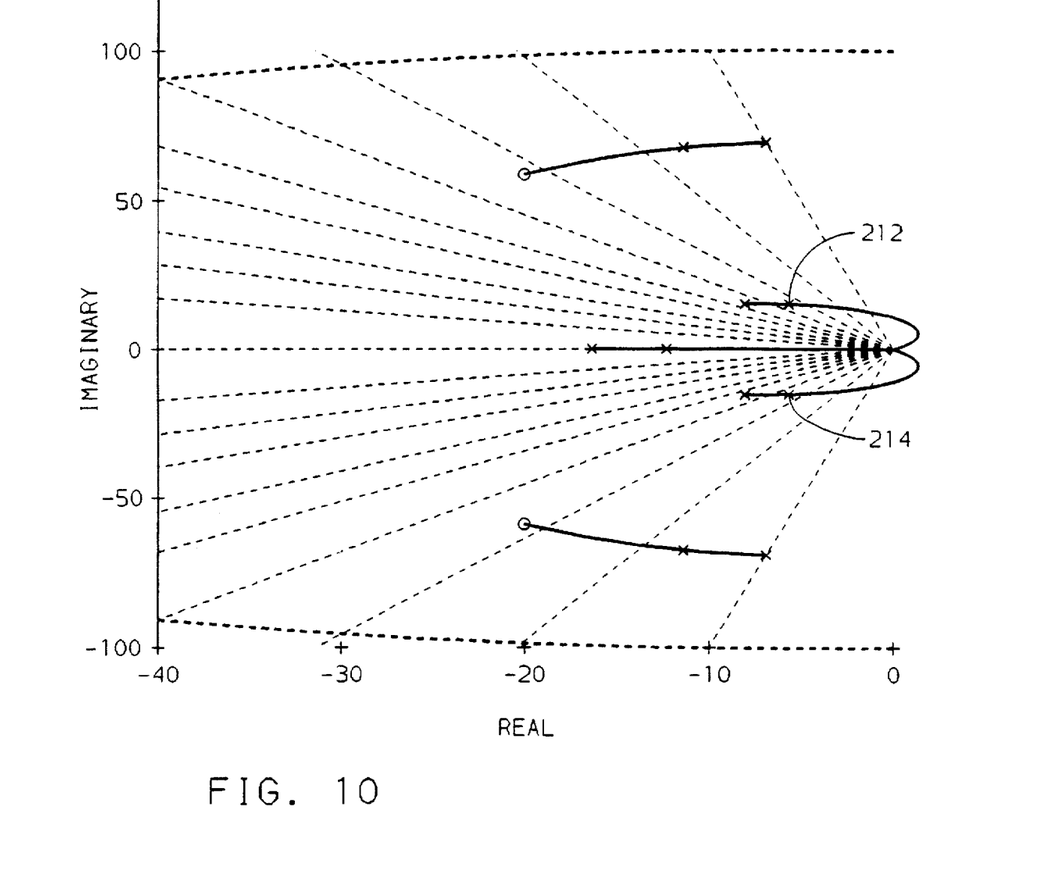
FIG. 10 illustrates an example root locus plot of the electric power steering control according to this invention.

Referring to FIG. 10, the root locus plot shown illustrates the performance of the control using the compensating filter 72 and the high pass/low pass filter. As long as the difference between the high pass filter gain and the low pass filter gain is not too great, then the closed loop poles 212 and 214 remain well damped, thus keeping the system stable.

While the following discussion refers to the operation of the return-to-center command, not all vehicles have high steering friction where it is desirable to implement a return-to-center assist. The portion of this invention relating to the assist command determination utilizing the compensation filter and high pass/low pass filter need not be used with a return-to-center command function.

Referring again to FIG. 3, block 80 performs a high resolution filter function on the vehicle speed signal on line 14 and provides the resultant high resolution filtered signal on line 81 to block 82. The details of block 80 are shown in FIG. 11.

Figure 11:
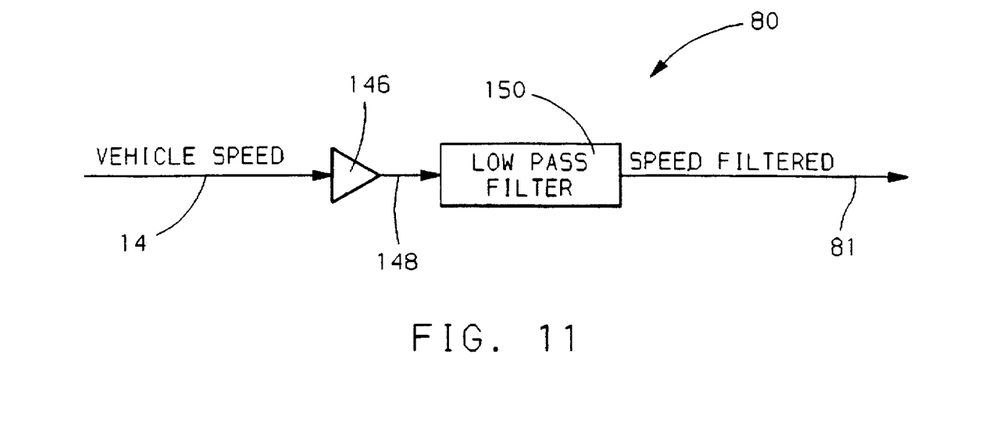
FIG. 11 illustrates the detail of block 80 of FIG. 3.

Referring now to FIG. 11, the vehicle speed signal on line 14 is amplified by amplifier 146 and the amplified vehicle speed signal is provided on line 148. Line 148 is provided to low pass filter 150 having a cut-off frequency in the 0.2–0.3 Hz range. The output of the low pass filter 150 is provided on line 81. The combination of amplifier 146 and low pass filter 150 operate to provide an apparent increase in resolution in the vehicle speed signal on line 14. The apparent resolution of the high resolution filter is 30 points between 0 and 5 kph. The apparent increased resolution in the speed signal provided by the high resolution filter 80 allows for smooth implementation of the return functions of block 82 (FIG. 3) during zero and low speed transitions.

Referring again to FIG. 3, the high resolution filtered speed signal on line 81 is provided together with the low pass filtered speed signal on line 78 and the steering wheel angle signal on line 20 to return command function block 82. Block 82 processes the signals on lines 20, 78 and 81 and provides a return command on line 66. Block 82 is better understood with reference to FIG. 12.

Figure 12:
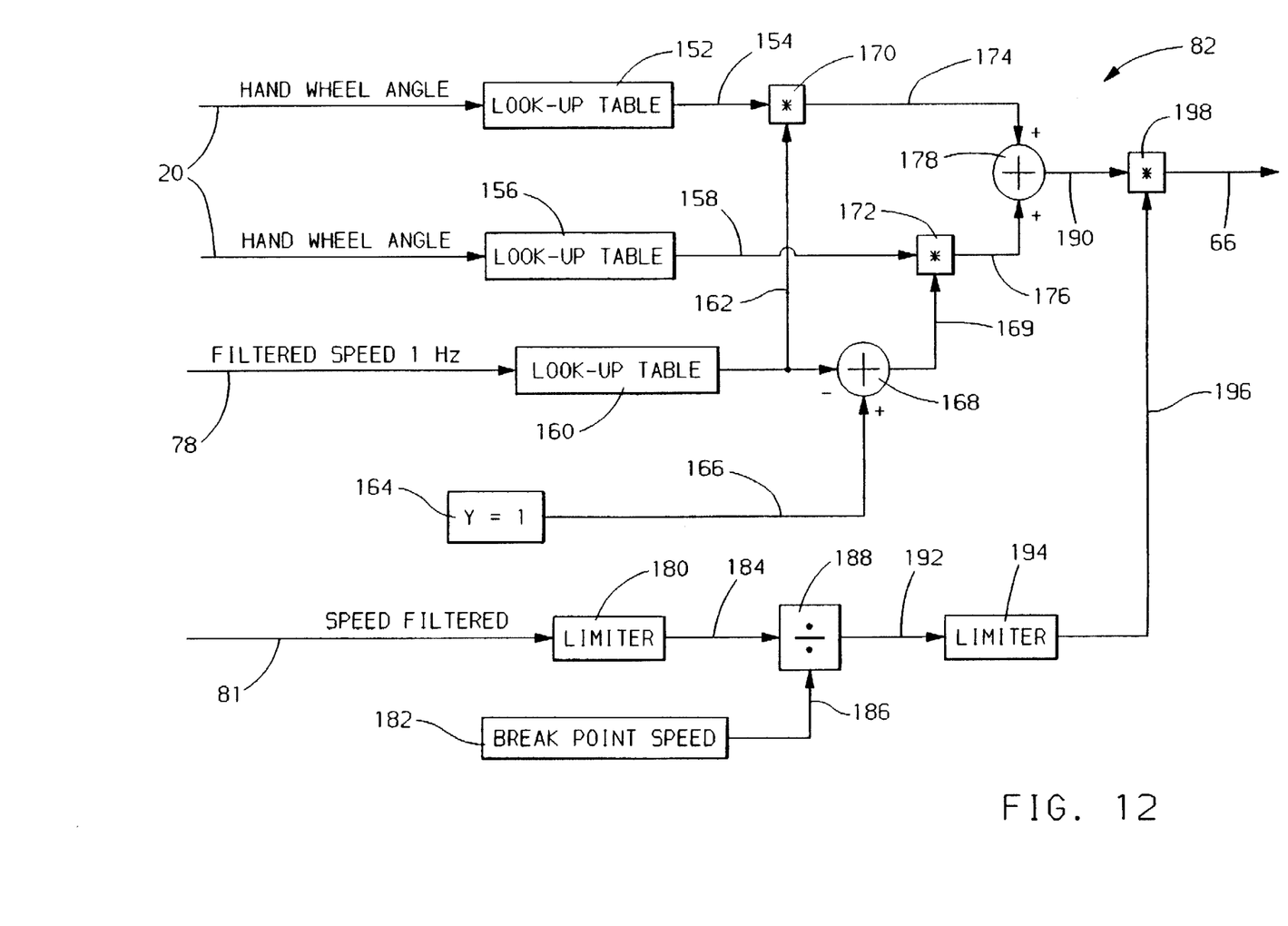
FIG. 12 illustrates the detail of block 82 of FIG. 3.

Referring now to FIG. 12, block 82 comprises function blocks 152, 156 and 160 for determining and blending return commands. Block 82 also comprises blocks 180, 182, 188 and 194 for limiting the return command.

More particularly, the steering wheel angle signals on line 20 are input to both blocks 152 and 156, which determine return commands as a function of the steering wheel angle signals. Preferably, blocks 152 and 156 are implemented in the form of lookup tables. Block 152 processes the steering wheel angle signal on line 20 and provides an output signal on line 154 indicative of the parking return command. The parking return command is the desired motor return current commanded during extremely low vehicle velocity events, such as occur when a vehicle is being operated under 15 or 20 kph—as in during parking lot type maneuvers. Block 156 processes the steering wheel angle signal on line 20 and provides an output signal on line 158 indicative of the highway return command. The highway return command is the desired motor return current commanded during highway velocity vehicle events, such as occur when the vehicle is on the highway and steered around a curve or steered in a passing maneuver.

Figure 13:
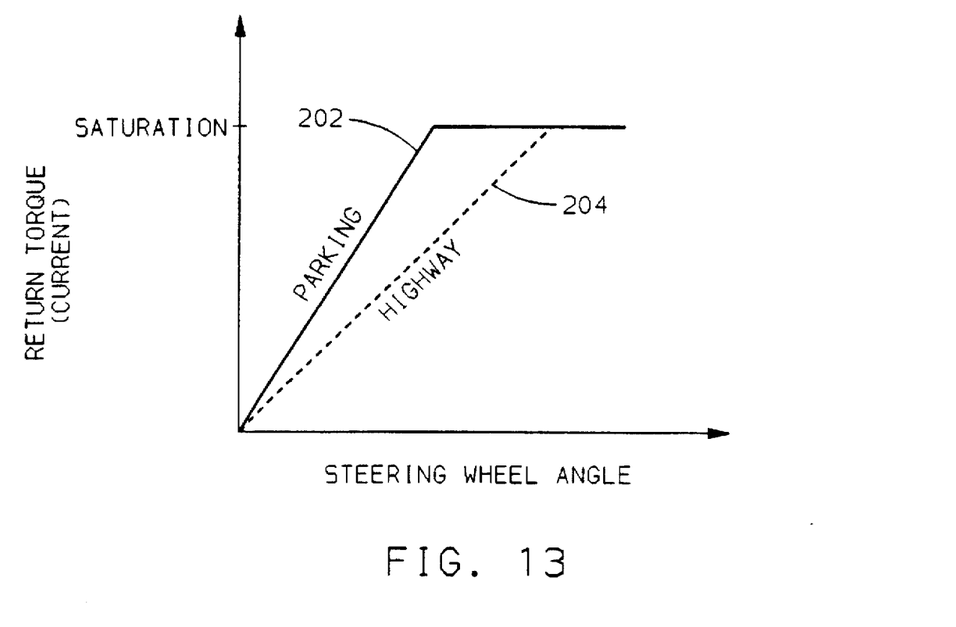
FIGS. 13 illustrates example functions of blocks 152 and 156 of FIG. 11.

The look-up table functions for blocks 152 and 156 are shown in FIG. 13. Referring to FIG. 13, trace 202 illustrates the look-up table function of block 152 and trace 204 illustrates the look-up table function of block 156. It is noted that, in this example, the functions 202 and 204 are linear with a saturation point and, thus, can also be implemented in a linear equation plus saturation function form. Also, traces 202 and 204 can be implemented as smooth or curved non-linear functions.

Figure 14:
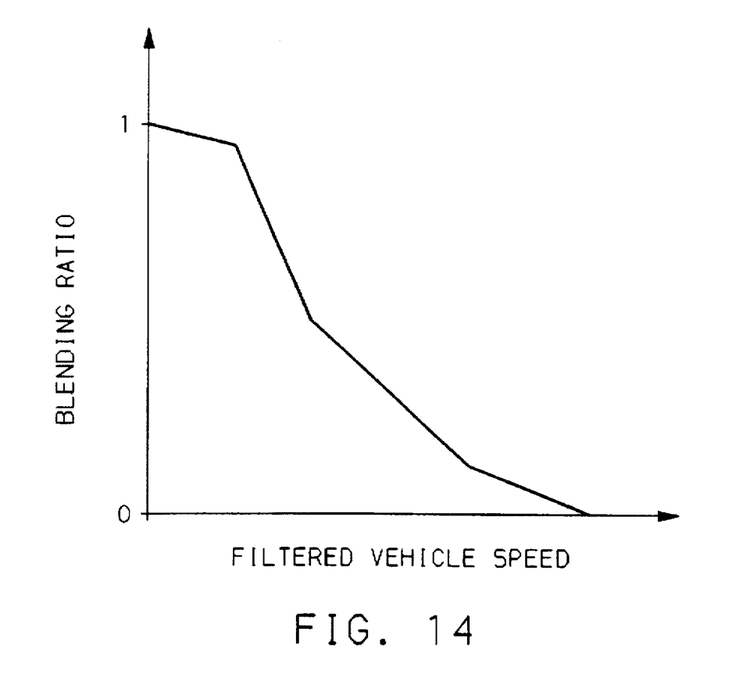
FIG. 14 illustrates an example function of block 160 of FIG. 11.

Block 160 determines the ratio by which the parking and highway return commands are blended. More particularly, the low pass filtered speed signal on line 78 is provided to block 160, which performs an operation to convert the speed signal on line 78 to a blending signal having a normalized value between 0 and 1. The function of block 160 is shown in FIG. 14. While FIG. 14 shows the function of block 160 as substantially linear between the several break points, the function may be implemented in the form of a curve or in the form of a straight line, as a system designer chooses to achieve a desired "feel" of the steering system.

The blending signal on line 162 is provided to block 170, where it is multiplied by the parking return command on line 154, with the resultant parking command component on line 174. The signal on line 162 is also provided to block 168, where it is subtracted from 1, represented by block 164 and line 166. The output of block 168 on line 169 is then provided to block 172, where it is multiplied by the highway return command on line 158. The product resulting from block 172 is the highway command component on line 176.

The parking and highway command components on lines 174 and 176 are provided to block 178, which sums the signals on lines 174 and 176 and provides the sum return command on line 190.

The high resolution filtered vehicle speed signal on line 81 is provided to block 180, where it is limited to a minimum of zero and a maximum of, for example, 6 kilometers per hour (kph). The limited signal on line 184 is then provided to block 188 where it is divided by the break speed, represented by block 182 and line 186, which, for example, is set to approximately 5 or 6 kph. The ratio of the signals on lines 184 and 186, on line 192, is then limited by block 194 to a maximum value of 1, and the result is provided on line 196. The signal on line 196 is provided to block 198 where it is multiplied by the sum return command on line 190 to determine the return-to-center command on line 66.

The result of blocks 180, 188 and 194 is a signal on line 196, that is equal to 1 for all vehicle speeds above the break speed (block 182), thus having no impact on the sum return command on line 190. However, for vehicle speeds below the break speed, the signal on line 196 is linearly reduced to zero as the vehicle speed reduces. This ramps out the return-to-center command on line 66 as vehicle speed reduces, thus providing a performance similar to conventional non-electric power steering systems or low friction steering systems in which the return-to-center torque on the steering wheel caused by the front wheels on the road surface is gradually reduced to zero at low vehicle speeds. Thus, this invention assures that no return-to-center torque can be generated when there is no road torque input on the vehicle drive wheels.

The benefit of using a high resolution filtered signal on line 81 as an input to block 180 is that the ramp-out function of the return-to-center torque is smooth and feels continuous. In the absence of the high resolution filter, this ramp out function might be step-wise in nature, which is not preferred. While the return-to-center function is shown in the context of a current mode control system, one skilled in the art will recognize that it is equally applicable to voltage mode systems Referring again to FIG. 3, the return-to-center command on line 66 and the assist command on line 64 are both provided to the summation block 68. Block 68 subtracts the return-to-center command from the assist command to provide a motor command signal on line 70. The motor command signal on line 70 is used to control the motor 46 to provide power assisted steering and return-to-center torque on the vehicle steering wheel.

The motor 46 shown in FIG. 1 may be a brushless motor, in which case the controller 16 includes a standard digital brushless motor driver.

Figure 15A:
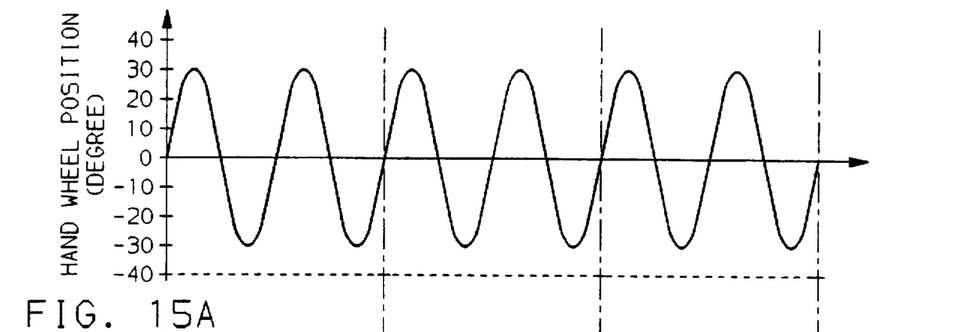
FIGS. 15A, 15B, 16A, 16B, 17A and 17B illustrate electric power steering control advantages of this invention
Figure 15B:
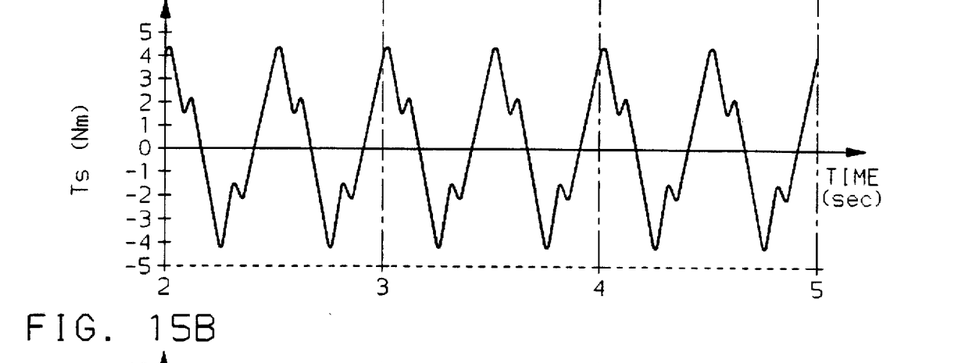
Figure 16A:
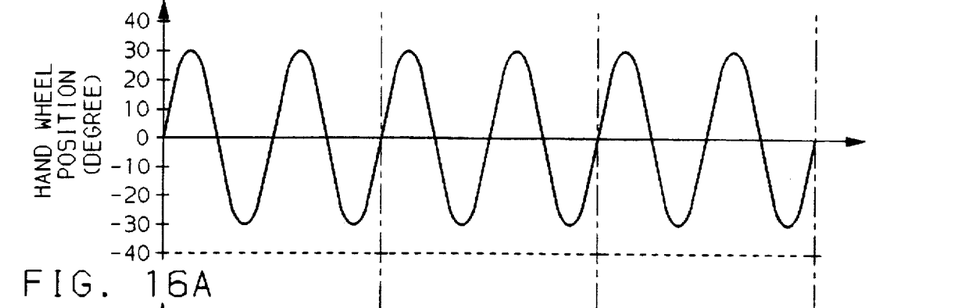
Figure 16B:
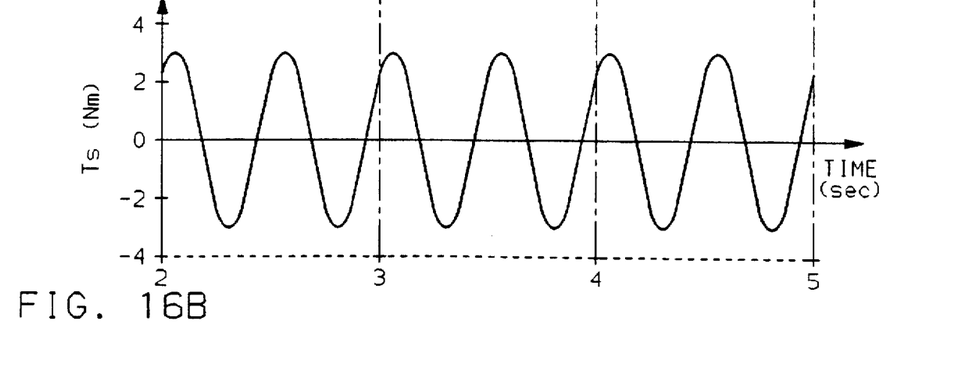

FIGS. 15A, 15B, 16A and 16B illustrates some of the advantages according to this invention. Referring to FIGS. 15A and 15B, a steering wheel position input and simulated steering column torque are shown, respectively, for a system that does not include the high pass/low pass filter according to this invention. As can be seen, a ringing of the torque occurs after each peak in the torque signal. Now referring to FIGS. 16A and 16B, the same steering wheel input is provided to the system that includes the high pass/low pass filter according to this invention. As can be seen, the steering column torque in FIG. 16B shows no ringing of the torque signal. The advantageous results of FIG. 16B were obtained with the scheduled gain of the high pass filter set equal to "4."

Figure 17A:
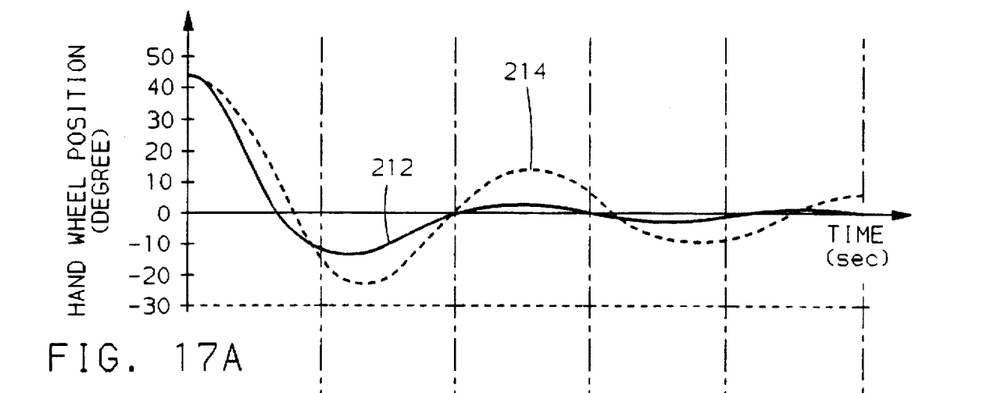
Figure 17B:
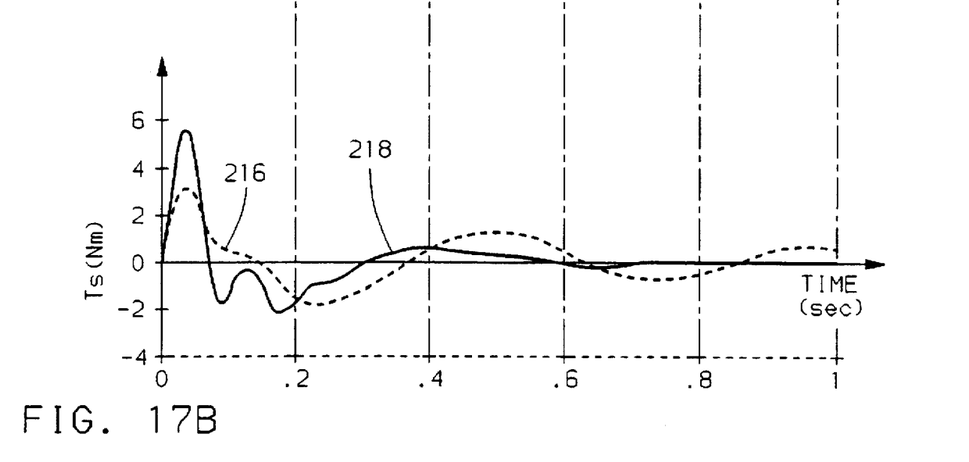

Referring now to FIGS. 17A and 17B an example steering event simulation implementing this invention is shown. The figures illustrate the steering wheel position and steering column torque as the steering system is released from the 45 degree off center position while the vehicle is traveling at road speeds. FIG. 17A shows that, with the control according to this invention, the steering wheel smoothly returns to the on-center position. Trace 212 illustrates the return to center operation with the scheduled gain of the high pass filter set equal to "1" and trace 214 illustrates the return to center operation with the scheduled high pass filter gain set equal to "4." FIG. 17B illustrates the steering column torque during the return to center of the steering wheel, the toque is representative of the torque input from the electric motor in returning the steering wheel to the center position. Trace 216 represents the torque when the high pass filter gain is set equal to "4" and trace 218 represents the torque when the high pass filter gain is set equal to "1." As can be seen, the steering system control according to this invention provides smooth and desirable return-to-center response, with the most control and virtually no ringing achieved when the high pass filter gain is set equal to "1."

The examples in FIGS. 16A, 16B, 17A and 17B illustrate the benefits achieved according to this invention by scheduling the high pass filter gain of the high pass/low pass filter responsive to the instantaneous low pass filter gain. If the high pass filter gain was not scheduled, i.e., was maintained high, then free control in the return-to-center operation would be compromised (trace 214, FIG. 17A). If the high pass filter gain was maintained low, then the response of the type obtained in FIG. 16B would not be as optimal. By scheduling the high pass filter gain responsive to the instantaneous low pass filter gain according to this invention, optimal control and high stability are obtained over the entire range of steering system inputs.

Further results of the high pass/low pass filter of this invention include allowing the system to reject disturbances such as motor torque irregularities, providing for smoother feel of the steering system.

It has further been found according to this invention that the high pass/low pass filter can be calibrated to tune the steering system response. For example, by increasing the high pass filter gain so that the high pass and low pass filter gains are further apart, the high pass filter provides a lead filter action, which reduces the influence of motor inertia on the system.

Further, steering column damping can be tuned for a specific system implementation by adjusting the high pass filter gain. For example, the response to a step function test, such as turning the steering wheel so that the vehicle is in turning while being driven at road speeds, can be tuned. The speed that the steering wheel returns to center position can be increased by increasing the gain of the high pass filter and a tendency of the steering wheel to oscillate about the center position (free control oscillations) can be reduced by decreasing the high pass filter gain. Thus this invention provides a robust electric power steering system that can be tuned for a wide variety of vehicle applications.

In one example, an electric power steering system in which the assist motor was driven in current mode was implemented without the compensation filter according to this invention. It was found that motor assist torque was limited to less than 4 Newton-meters to prevent the control system from causing undesirable shaking of the steering wheel. A typical driver input torque is in the range of 0 to 5 Newton-meters and an assist torque limited to less than 4 Newton-meters is generally unsatisfactory. With the implementation of the compensation filter according to this invention, the assist motor was operated in current mode to provide up to approximately 40 Newton-meters of assist torque while maintaining a smooth feel to the steering wheel. This illustrates an increase by a factor of 10 in the amount of torque assist available when the compensation filter according to this invention is implemented and the motor is operated in current mode.

The embodiments of this invention in which an exclusive property or privilege is claimed are defined as follows:

1. An electric power steering control apparatus comprising:

a vehicle steering wheel;

a torque sensor for sensing torque in the vehicle steering system;

a motor for providing motive force power assist to the steering system;

a controller receiving the torque sensor signal and providing a motor control command to the motor responsive thereto, wherein the motor provides the motive force power assist responsive to the motor control command; and a high pass/low pass filter in the controller, wherein the high pass/low pass filter isolates low frequency components of the sensed vehicle steering system torque primarily representing operator input torque and wherein the controller, responsive to the low frequency components determines a first, driver responsive, component of the motor control command, wherein the high pass/low pass filer isolates high frequency components of the sensed vehicle steering system torque responsive to a high frequency gain, wherein the high frequency gain is responsive to the low frequency components, and wherein the controller, responsive to the high frequency components, determines a second component of the motor control command that maintains closed loop control over an entire range of driver inputs.

2. An electric power steering control method according to the steps of:

sensing steering torque;

isolating high and low frequency components of the sensed steering torque;

responsive to the low frequency component, determining a driver responsive motor command;

responsive to the low frequency component, determining a high frequency gain:

responsive to the high frequency component and the high frequency gain, determining a high frequency responsive motor command;

summing the driver responsive and high frequency responsive motor commands to determine a power assist motor command;

controlling an electric motor responsive to the power assist motor command, wherein the electric motor responsively provides assist torque to the power steering system, wherein the electric power steering control maintains closed loop gains when an operator input steering torque is low or zero.

3. An electric power steering control method according to claim 2, wherein the step of determining the driver responsive motor command determines the drive responsive motor command responsive to a low frequency gain, wherein the high frequency gain is greater than the low frequency gain and less than the low frequency gain plus a predetermined offset.

4. An electric power steering control method according to the steps of:

sensing steering torque;

isolating high and low frequency components of the sensed steering torque;

responsive to the low frequency component and a first variable gain, determining a driver responsive motor command, wherein the first variable gain varies according to an instantaneous value of the low frequency component;

scheduling, responsive to one of the low frequency component and the first variable gain, a second variable gain;

responsive to the high frequency component and the second variable gain, determining a high frequency responsive motor command;

summing the driver responsive and high frequency responsive motor commands to determine a power assist motor command;

controlling an electric motor responsive to the power assist motor command, wherein the electric motor responsively provides assist torque to the power steering system, wherein the electric power steering control maintains closed loop gains when an operator input steering torque is low or zero.

5. An electric power steering control system comprising:

a steering torque sensor providing a steering torque signal;

a high pass/low pass filter responsive to the steering torque signal and isolating high and low frequency components of the steering torque signal;

a driver-responsive command generator, responsive to the low frequency component of the steering torque signal and a first variable gain, and outputting a driver responsive motor command, wherein the first variable gain varies according to an instantaneous value of the low frequency component of the steering torque signal;

a gain scheduler, responsive to one of the low frequency component of the steering torque sensor and the first variable gain, outputting a second variable gain;

a high frequency responsive command generator, responsive to the high frequency component of the steering torque signal and the second variable gain, outputting a high frequency responsive motor command;

a command summer, summing the driver responsive and high frequency responsive motor commands to determine a power assist motor command; and an electric motor controlled responsive to the power assist motor command, wherein the electric motor responsively provides assist torque to the power steering system, wherein the electric power steering control maintains closed loop gains when an operator input steering torque is low or zero.

6. An electric power steering control system according to claim 5, wherein the electric motor has output torque irregularities and wherein, responsive to the high pass/low pass filter and the high frequency responsive command generator, the electric power steering control system compensates for the output torque irregularities.

7. An electric power steering control system according to claim 5, wherein the electric motor has an inertia that tends to effect the electric power steering control system, wherein high pass/low pass filter, the second variable gain and the high frequency responsive command generator reduces the influence of the electric motor inertia on the electric power steering control system.

8. An electric power steering control system according to claim 5, wherein a damping of the power steering system is responsive to the second variable gain.

* * * * *